(12) United States Patent
Gady et al.

(10) Patent No.: US 9,920,698 B2
(45) Date of Patent: Mar. 20, 2018

(54) RECIRCULATION VALVE CONTROL SYSTEMS AND METHODS

(71) Applicant: GM Global Technology Operations LLC, Detroit, MI (US)

(72) Inventors: Kevin Andrew Gady, Saline, MI (US); Timo Beck, Worrstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 953 days.

(21) Appl. No.: 14/252,921

(22) Filed: Apr. 15, 2014

(65) Prior Publication Data
US 2015/0292396 A1  Oct. 15, 2015

(51) Int. Cl.
| | |
|---|---|
| *F02B 33/44* | (2006.01) |
| *F02D 41/00* | (2006.01) |
| *F02B 37/16* | (2006.01) |
| F02D 41/18 | (2006.01) |
| F02D 11/10 | (2006.01) |
| F02D 41/14 | (2006.01) |

(52) U.S. Cl.
CPC .......... *F02D 41/0007* (2013.01); *F02B 37/16* (2013.01); *F02D 11/105* (2013.01); *F02D 41/0087* (2013.01); *F02D 41/18* (2013.01); *F02D 2041/1431* (2013.01); *F02D 2200/0406* (2013.01); *Y02T 10/144* (2013.01)

(58) Field of Classification Search
CPC ........ F02B 37/00; F02B 37/16; F02B 37/162; F02B 37/164; F02B 37/18; F02B 37/183; F02D 41/0002; F02D 41/0007; F02D 2200/10; F02D 2200/1002; F02D 11/105; F02D 2041/1431
USPC ................. 60/611, 602, 605.2; 701/102–104
See application file for complete search history.

(56) References Cited

U.S. PATENT DOCUMENTS

| | | | |
|---|---|---|---|
| 2012/0123663 A1 | 5/2012 | Panciroli | |
| 2014/0298802 A1 | 10/2014 | Suzuki et al. | |
| 2014/0305412 A1* | 10/2014 | Ahrns | F02B 37/14 |
| | | | 123/562 |
| 2015/0051762 A1* | 2/2015 | Banker | B60W 10/06 |
| | | | 701/22 |

FOREIGN PATENT DOCUMENTS

| | | |
|---|---|---|
| CN | 101353969 A | 1/2009 |
| WO | WO-2013027267 A1 | 2/2013 |
| WO | WO-2013/077155 A1 | 5/2013 |

* cited by examiner

Primary Examiner — Ngoc T Nguyen

(57) ABSTRACT

A control system for a recirculation valve of a turbocharger includes a target boost module, a close request module, and a close delay module. The target boost module determines a target boost for the turbocharger based on a torque request. The close request module selectively generates a close request to close the recirculation valve based on the target boost. The close delay module, in response to the generation of the close request, delays closing of the recirculation valve.

20 Claims, 8 Drawing Sheets

RECIRCULATION VALVE CONTROL SYSTEMS AND METHODS

FIELD

The present disclosure relates to turbochargers and more particularly to recirculation valve control systems and methods.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to produce drive torque. The engine outputs exhaust to an exhaust system. Some engines include one or more turbochargers. A turbocharger includes a turbine and a compressor. Exhaust drives the turbine, and the turbine drives the compressor. The compressor pumps air into the engine for combustion. An engine including one or more turbochargers can therefore produce more power than the same naturally aspirated engine.

A turbine bypass valve may enable exhaust to bypass the turbine. A recirculation valve may recirculate air from a compressor outlet to a compressor inlet. The turbine bypass valve and the recirculation valve may be mechanically or electronically controlled.

SUMMARY

A control system for a recirculation valve of a turbocharger includes a target boost module, a close request module, and a close delay module. The target boost module determines a target boost for the turbocharger based on a torque request. The close request module selectively generates a close request to close the recirculation valve based on the target boost. The close delay module, in response to the generation of the close request, delays closing of the recirculation valve.

In further features, the close request module generates the close request to close the recirculation valve when the target boost is greater than a predetermined boost.

In still further features, the close request module generates the close request when the target boost is greater than ambient pressure.

In yet further features, the close delay module closes the recirculation valve a predetermined delay period after the close request is generated.

In further features, after the close request is generated, the close delay module closes the recirculation valve based on a comparison of a potential pressure ratio across a compressor of the turbocharger and a predetermined pressure ratio across the compressor of the turbocharger.

In still further features, the close delay module closes the recirculation valve when the potential pressure ratio is greater than the predetermined pressure ratio.

In yet further features, the close delay module maintains the recirculation valve open when the potential pressure ratio is less than the predetermined pressure ratio.

In further features, the close delay module determines the potential pressure ratio based on a speed of a turbine of the turbocharger and a mass air flowrate.

In still further features, the close delay module determines the speed of the turbine based on a pressure ratio across the turbine, an exhaust mass flowrate, and an exhaust temperature.

In yet further features, the close delay module determines the potential pressure ratio for if the recirculation valve was closed.

A method includes: determining a target boost for a turbocharger based on a torque request; selectively generating a close request to close a recirculation valve of the turbocharger based on the target boost; and delaying closing of the recirculation valve of the turbocharger in response to the generation of the close request.

In further features, the method further includes generating the close request to close the recirculation valve when the target boost is greater than a predetermined boost.

In still further features, the method further includes generating the close request when the target boost is greater than ambient pressure.

In yet further features, the method further includes closing the recirculation valve a predetermined delay period after the close request is generated.

In further features, the method further includes, after the close request is generated, closing the recirculation valve based on a comparison of a potential pressure ratio across a compressor of the turbocharger and a predetermined pressure ratio across the compressor of the turbocharger.

In still further features, the method further includes closing the recirculation valve when the potential pressure ratio is greater than the predetermined pressure ratio.

In yet further features, the method further includes maintaining the recirculation valve open when the potential pressure ratio is less than the predetermined pressure ratio.

In further features, the method further includes determining the potential pressure ratio based on a speed of a turbine of the turbocharger and a mass air flowrate.

In still further features, the method further includes determining the speed of the turbine based on a pressure ratio across the turbine, an exhaust mass flowrate, and an exhaust temperature.

In yet further features, the method further includes determining the potential pressure ratio for if the recirculation valve was closed.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An engine combusts air and fuel within cylinders to generate drive torque. The engine outputs exhaust to an exhaust system. A turbine of a turbocharger is connected to the exhaust system, and a compressor of the turbocharger provides compressed air to the engine. A turbine bypass valve enables exhaust to bypass the turbine, and a recirculation valve recirculates air from a compressor outlet to a compressor inlet.

A turbocharger control module controls the recirculation valve. For example, when a target boost for the turbocharger is low or equal to ambient pressure, the turbocharger control module may open the recirculation valve. This may prevent the compressor from restricting airflow into the engine.

The turbocharger control module may close the recirculation valve when the target boost increases or is greater than a predetermined boost. However, closing the recirculation valve when the target boost increases may restrict airflow into the engine as the compressor speed increases. The turbocharger control module therefore delays closing of the recirculation valve after the target boost increases.

Figure 1:
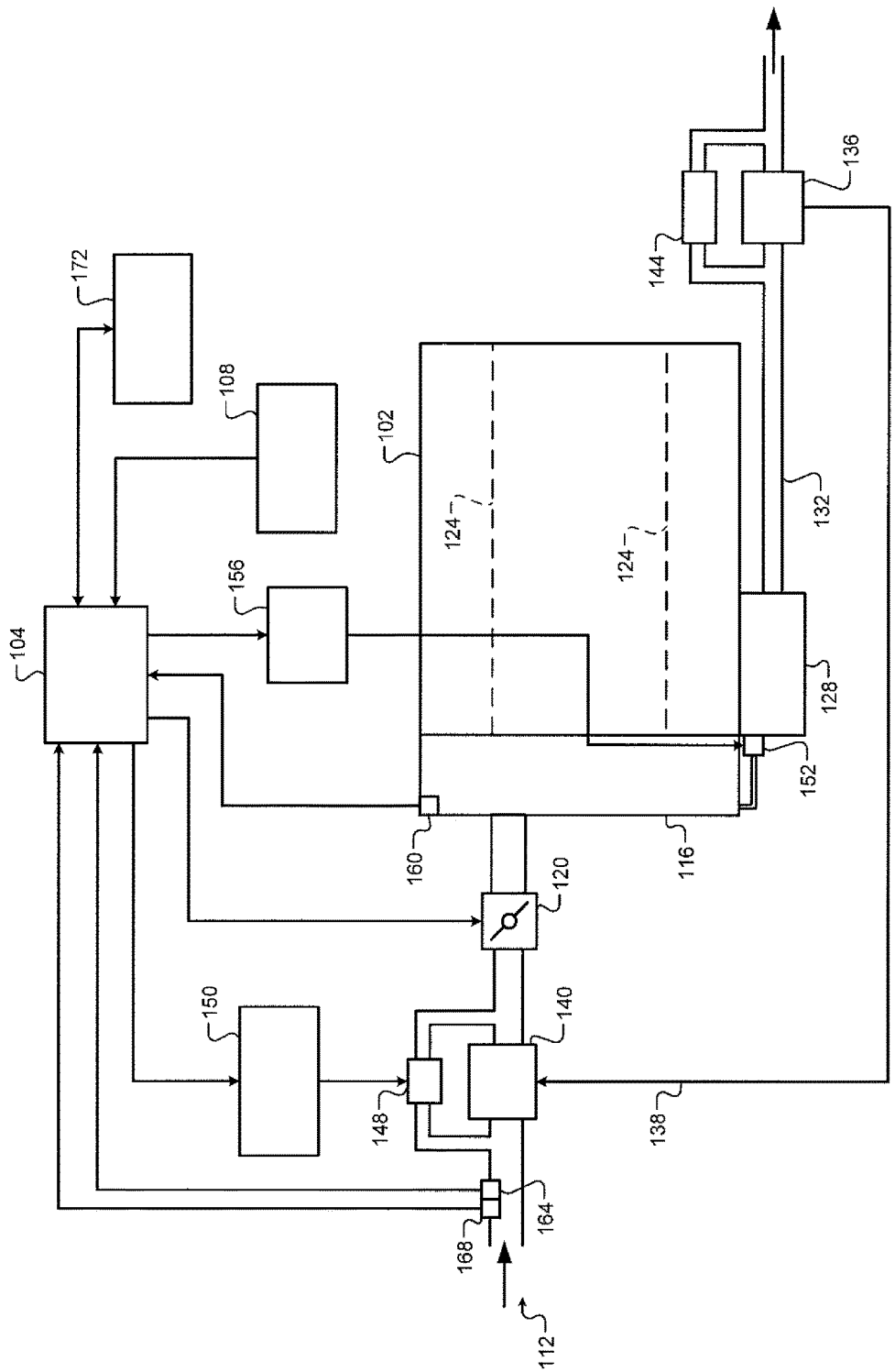
FIG. 1 is a functional block diagram of an example engine and exhaust system according to the present disclosure.

Referring now to FIG. 1, a functional block diagram of an example engine and exhaust system is presented. The system includes an engine 102 and an engine control module (ECM) 104. The engine 102 combusts an air/fuel mixture to produce drive torque for a vehicle. The ECM 104 controls the engine 102 based on driver input received from a driver input module 108.

Air is drawn into the engine 102 through an intake system 112. The intake system 112 may include an intake manifold 116 and a throttle valve 120. For example only, the throttle valve 120 may include a butterfly valve having a rotatable blade. The ECM 104 may control an opening of the throttle valve 120 to control the amount of air drawn into the intake manifold 116.

Air from the intake manifold 116 is drawn into one or more cylinders of the engine 102, such as a cylinder 124. For example only, the engine 102 may include 2, 3, 4, 5, 6, 8, 10, and/or 12 cylinders. Under some circumstances, the ECM 104 may selectively deactivate one or more of the cylinders, which may improve fuel economy under certain engine operating conditions. The cylinders output exhaust to an exhaust manifold 128. The exhaust manifold 128 outputs the exhaust to an exhaust pipe 132.

The engine 102 may operate using a four-stroke cycle. The four strokes are named the intake stroke, the compression stroke, the combustion stroke, and the exhaust stroke. During each revolution of a crankshaft (not shown), two of the four strokes occur within the cylinder 124. Therefore, two crankshaft revolutions are necessary for the cylinder 124 to experience all four of the strokes.

The injected fuel mixes with air and creates an air/fuel mixture in the cylinder 124. A piston (not shown) within the cylinder 124 compresses the air/fuel mixture. The engine 102 may be a compression-ignition engine, in which case compression in the cylinder ignites the air/fuel mixture. Alternatively, the engine 102 may be a spark-ignition engine, in which case a signal from the ECM 104 energizes a spark plug in the cylinder 124, which ignites the air/fuel mixture. The timing of the spark may be specified relative to the time when the piston is at its topmost position, referred to as top dead center (TDC).

The timing of the spark may be controlled by a timing signal specifying how far before or after TDC to generate the spark. Because piston position is directly related to crankshaft rotation, spark timing may be synchronized with the crankshaft angle. In various implementations, spark to deactivated cylinders may be halted.

A turbocharger provides pressurized air to the intake manifold 116. The turbocharger includes a turbine 136 and a compressor 140. Exhaust flow drives the turbine 136. The turbine 136 is mechanically coupled, as shown at 138, to the compressor 140, and the turbine 136 drives rotation of the compressor 140. The compressor 140 provides compressed air to the throttle valve 120.

A turbine bypass valve 144 (or wastegate) may enable exhaust to bypass the turbine 136. While the turbine bypass valve 144 is shown as being external to the turbine 136, the turbine bypass valve 144 may be implemented within a housing of the turbine 136. The turbine bypass valve 144 can be mechanically or electronically controlled. For example, an exhaust pressure may mechanically open and close the turbine bypass valve 144. In another example, the ECM 104 may control the turbine bypass valve 144.

A recirculation valve 148 may enable air to be recirculated from an outlet of the compressor 140 to an inlet of the compressor 140. A valve actuator module 150 controls the recirculation valve 148 based on signals from the ECM 104. Closing the recirculation valve 148 when boost is requested may cause a decrease in airflow due to the slow speed of the compressor 140. As described below in further detail, delaying the closing of the recirculation valve 148 when boost is requested may enable the compressor 140 to speed up and the boost to rise more smoothly and quickly.

An exhaust gas recirculation (EGR) valve 152 selectively redirects exhaust from the exhaust system back to the intake manifold 116. An EGR actuator module 156 may control the EGR valve 152 based on signals from the ECM 104.

A pressure within the intake manifold 116 may be measured using a manifold absolute pressure (MAP) sensor 160. In various implementations, engine vacuum, which may refer to a difference between ambient air pressure and the pressure within the intake manifold 116, may be measured. A mass air flowrate (MAF) sensor 164 measures a mass air flowrate into the intake manifold 116. An ambient temperature of air flowing into the engine 102 may be measured using an intake air temperature (IAT) sensor 168. The ECM 104 may use signals from the sensors to make control decisions for the engine system.

The ECM 104 may communicate with a transmission control module 172 to coordinate shifting gears in a transmission (not shown). For example, the ECM 104 may reduce engine torque during a gear shift. The ECM 104 may communicate with a hybrid control module to coordinate operation of the engine 102 and an electric motor.

Figure 2:
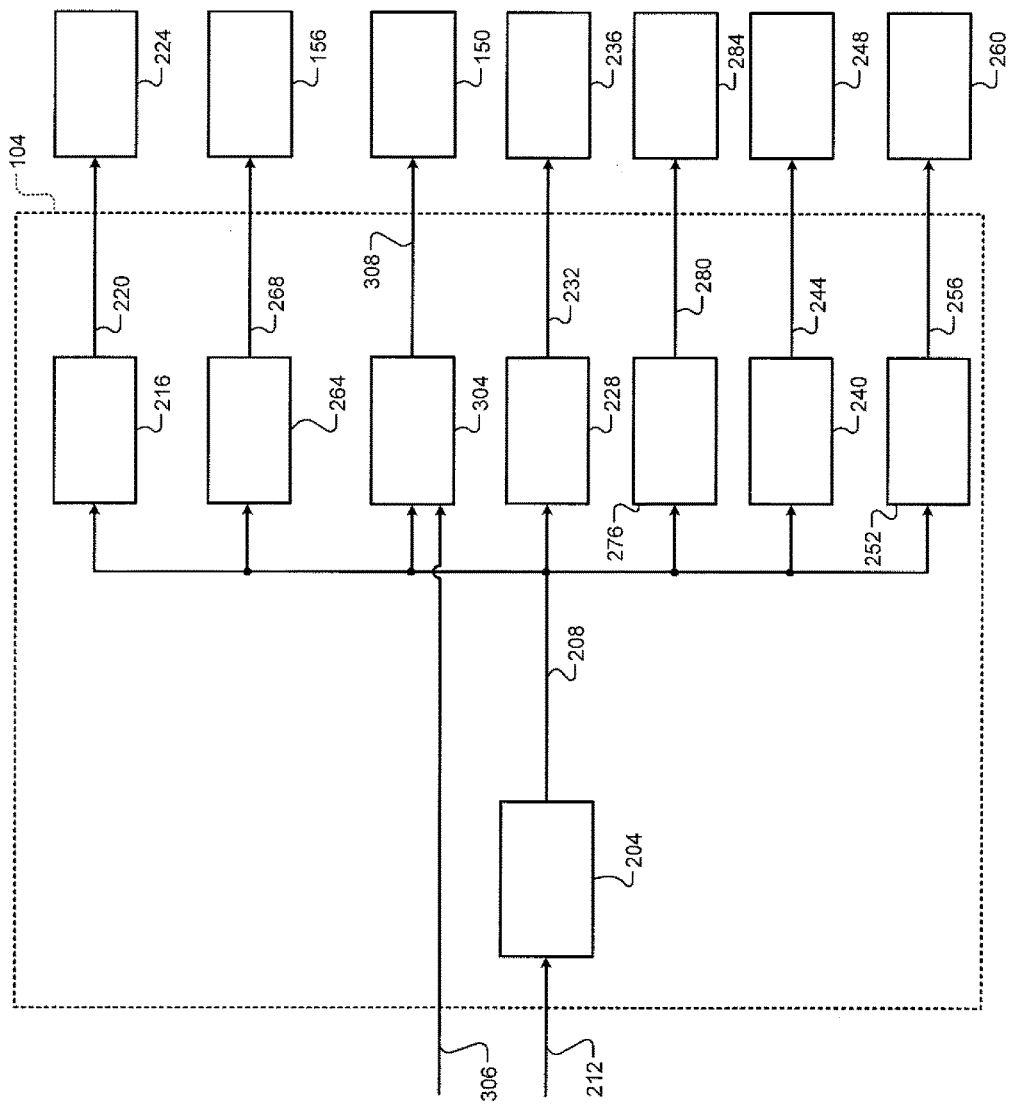
FIG. 2 is a functional block diagram of an example engine control module according to the present disclosure.

Referring now to FIG. 2, a functional block diagram of an example implementation of the ECM 104 is presented. A torque request module 204 may determine a torque request 208 based on one or more driver inputs 212, such as an accelerator pedal position, a brake pedal position, a cruise control input, and/or one or more other suitable driver inputs. The torque request module 204 may determine the torque request 208 additionally or alternatively based on one or more other requests, such as torque requests generated by the ECM 104 and/or torque requests received from other modules of the vehicle, such as the transmission control module 172, the hybrid control module, a chassis control module, etc. One or more engine actuators may be controlled based on the torque request 208 and/or one or more other vehicle operating parameters.

For example, a throttle control module 216 may determine a target throttle opening 220 based on the torque request 208. A throttle actuator module 224 may adjust opening of the throttle valve 120 based on the target throttle opening 220. A spark control module 228 may determine a target spark timing 232 based on the torque request 208. A spark actuator module 236 may generate spark based on the target spark timing 232.

A fuel control module 240 may determine one or more target fueling parameters 244 based on the torque request 208. For example, the target fueling parameters 244 may include number of fuel injection pulses (per combustion event), timing for each pulse, and amount for each pulse. A fuel actuator module 248 may inject fuel based on the target fueling parameters 244.

A cylinder control module 252 may determine a target number of cylinders to activate and/or deactivate 256 based on the torque request 208. A cylinder actuator module 260 may activate and deactivate cylinders of the engine 102 based on the target number 256. An EGR control module 264 may determine a target EGR opening 268 for the EGR valve 152 based on the torque request 208. The EGR actuator module 156 may control the EGR valve 152 based on the target EGR opening 268.

A phaser control module 276 may determine target phaser positions 280 for intake and exhaust camshafts based on the torque request 208. A phaser actuator module 284 controls phasing of the intake and exhaust camshafts via intake and exhaust cam phasers based on the target phaser positions 280. In various implementations, camless valve actuators may be used.

A turbocharger control module 304 (see also FIG. 3) selectively generates a close command 308 based on the torque request 208. The valve actuator module 150 closes the recirculation valve 148 when the close command 308 is generated.

Figure 3:
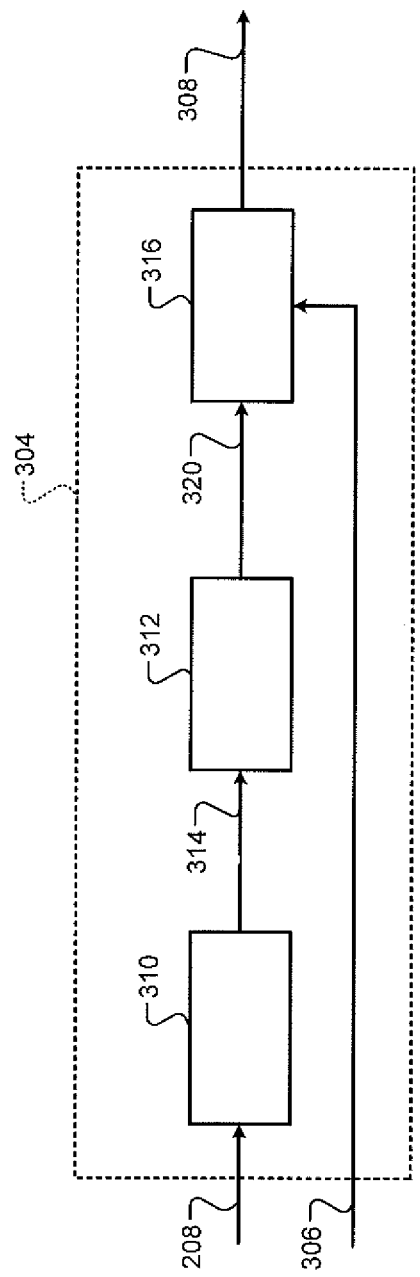
FIG. 3 is a functional block diagram of an example turbocharger control module according to the present disclosure.

Referring now to FIG. 3, a functional block diagram of an example implementation of the turbocharger control module 304 is presented. The turbocharger control module 304 includes a target boost module 310, a close request module 312, and a close delay module 316.

The target boost module 310 determines a target boost 314 for the turbocharger based on the torque request 208. For example, the target boost module 310 may determine the target boost 314 using one or more functions and/or mappings of the torque request 208 to the target boost 314. The target boost 314 may correspond to an amount of air compression to be provided by the turbocharger.

The close request module 312 generates a close request 320 based on the target boost 314. For example, the close request module 312 may generate the close request 320 when the target boost 314 is greater than a predetermined value, such as ambient pressure. The close request 320 is a request to close the recirculation valve 148.

When the close request 320 is generated, the close delay module 316 delays generation of the close command 308. For example, the close delay module 316 may generate the close command 308 a predetermined delay period after the close request 320 is generated. Additionally or alternatively, the close delay module 316 may delay the generation of the close command 308 based on a comparison of a potential pressure ratio and a predetermined pressure ratio.

Figure 4A:
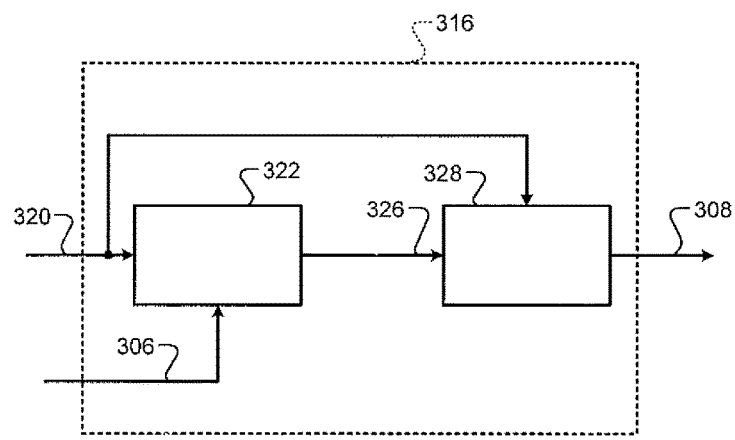
FIGS. 4A and 4B are functional block diagrams of example close delay modules according to the present disclosure.

Referring now to FIG. 4A, a functional block diagram of an example implementation of the close delay module 316 is presented. The close delay module 316 includes a delay determination module 322 and a command generation module 328. The delay determination module 322 determines a predetermined delay period 326. The predetermined delay period 326 may be stored in memory. For example, the predetermined delay period 326 may be approximately 100 milliseconds (ms), 200 ms, 300 ms, or another suitable period.

The command generation module 328 resets a timer and starts the timer when the close request 320 is generated. The command generation module 328 generates the close command 308 based on a comparison of the timer value with the predetermined delay period 326. For example, the command generation module 328 may not generate the close command 308 when the timer value is less than the predetermined delay period 326. The command generation module 328 generates the close command 308 when the timer value is greater than or equal to the predetermined delay period 326. The valve actuator module 150 closes the recirculation valve 148 when the close command 308 is generated. In this manner, the close delay module 316 delays the closing of the recirculation valve 148 for the predetermined delay period 326 after the close request 320 is generated.

Figure 4B:
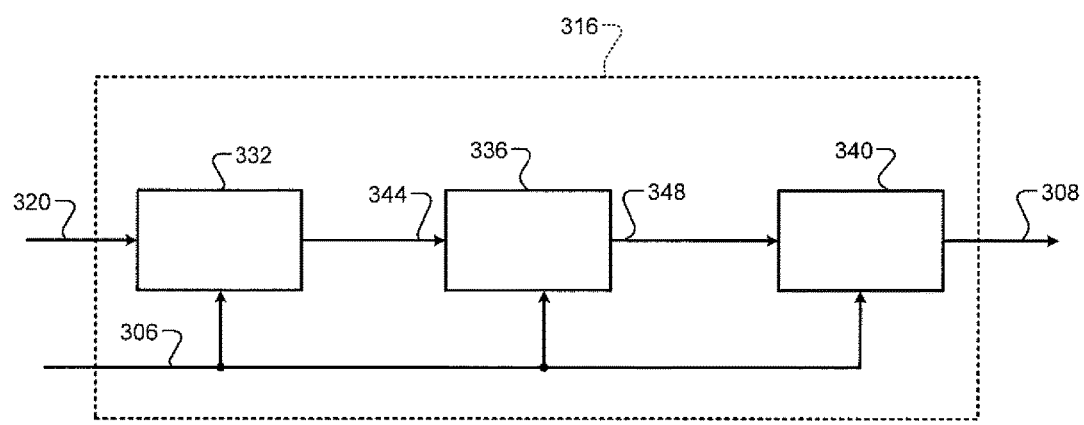

Referring now to FIG. 4B, a functional block diagram of another example implementation of the close delay module 316 is presented. The close delay module 316 includes a speed determination module 332, a pressure determination module 336, and a command generation module 340. The speed determination module 332 determines a turbine speed 344 based on one or more of the operating parameter(s) 306. For example, the speed determination module 332 may determine the turbine speed 344 based on at least one of a turbine pressure ratio, an exhaust mass flowrate, and an exhaust temperature. The speed determination module 332 may determine the turbine speed 344 using one or more functions and/or mappings that relate the operating parameter(s) 306 to the turbine speed 344.

The pressure determination module 336 determines a potential compressor pressure ratio 348 based on the turbine speed 344 and one or more of the operating parameter(s) 306. For example, the pressure determination module 336 may determine the potential compressor pressure ratio 348 based on a mass air flowrate and the turbine speed 344. The pressure determination module 336 may determine the potential compressor pressure ratio 348 using one or more functions and/or mappings that relate the turbine speed 344 and the operating parameter(s) 306 to the potential compressor pressure ratio 348. The potential compressor pressure ratio 348 may correspond to a pressure ratio across the compressor 140 if the recirculation valve 148 was closed.

The command generation module 340 compares the potential compressor pressure ratio 348 to a predetermined pressure ratio across the compressor 140. When the potential compressor pressure ratio 348 is greater than the predetermined pressure ratio, the command generation module 340 generates the close command 308. The valve actuator module 150 closes the recirculation valve 148 when the close command 308 is generated. When the potential compressor pressure ratio 348 is less than the predetermined pressure ratio, the command generation module 340 does not generate the close command 308, and the recirculation valve 148 stays open. The predetermined pressure ratio may be a calibrated value and may be set based on an exhaust pressure necessary to open the turbine bypass valve 144 and/or one or more other suitable parameters.

Figure 5A:
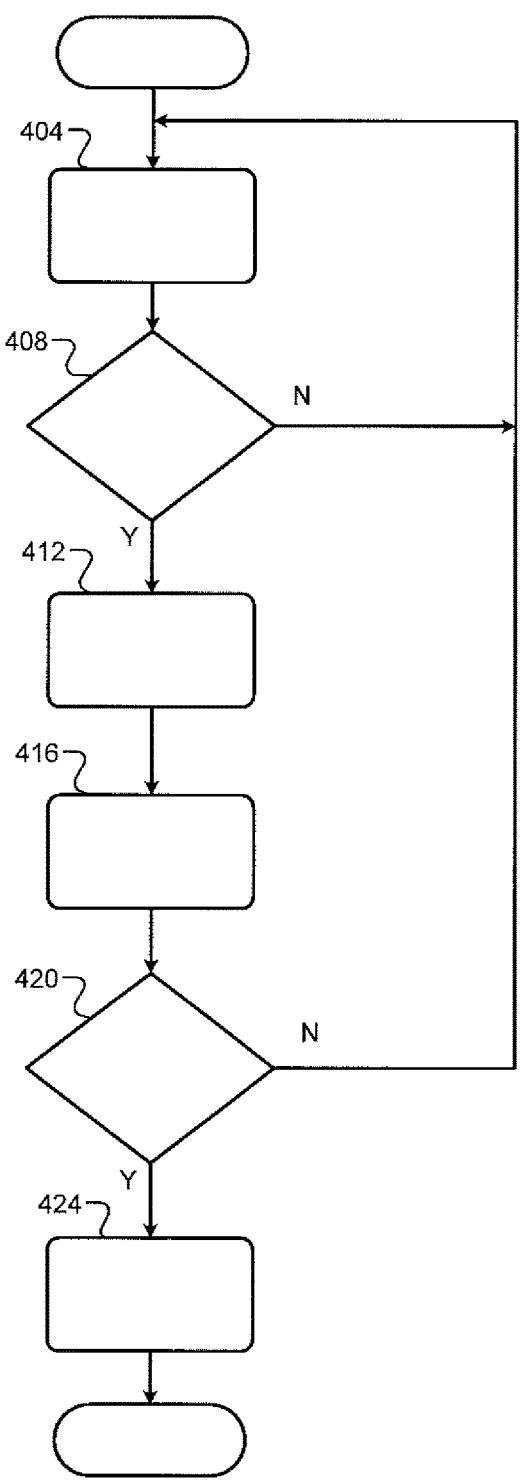
FIGS. 5A and 5B are flowcharts depicting example methods of closing a recirculation valve according to the present disclosure.

Referring now to FIG. 5A, a flowchart depicting an example method of closing the recirculation valve 148 is presented. Control may begin with 404 where the target boost module 310 determines the target boost 314 based on the torque request 208. The close request module 312 determines whether to generate the close request 320 for the recirculation valve 148 at 408. If 408 is false, control returns to 404. If 408 is true, the close request module 312 generates the close request 320 at 412. For example, the close request module 312 may generate the close request 320 when the target boost 314 is greater than the predetermined boost, such as ambient pressure.

The delay determination module 322 determines the predetermined delay period 326 at 416. The command generation module 328 determines whether the predetermined delay period 326 has passed at 420 (after the close request 320 was generated). If 420 is true, the command generation module 328 generates the close command 308 at 424. If 420 is false, control may return to 404. The valve actuator module 150 closes the recirculation valve 148 when the close command 308 is generated.

Figure 5B:
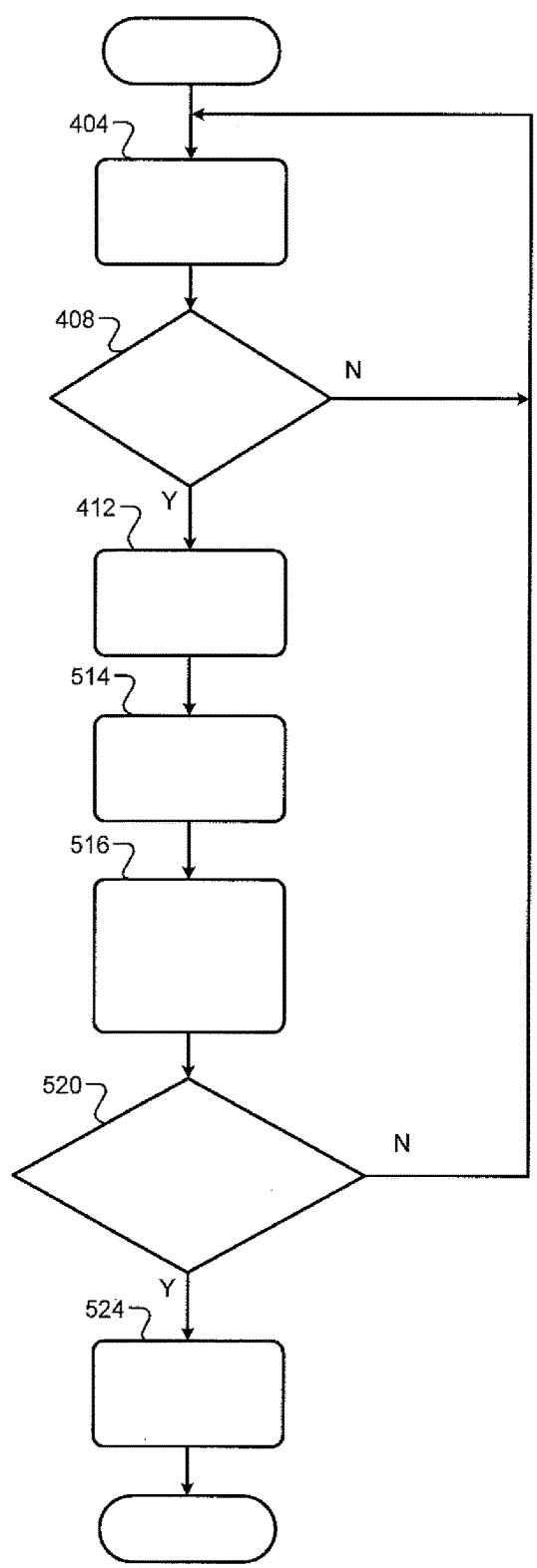

Referring now to FIG. 5B, a flowchart depicting another example method of closing the recirculation valve 148 is presented. Control may begin with 404-412, as described above. Control continues with 514.

The speed determination module 332 determines the turbine speed 344 at 514, for example, based on the turbine pressure ratio, the exhaust mass flowrate, and/or the exhaust temperature. The pressure determination module 336 determines the potential compressor pressure ratio 348 at 516, for example, based on the turbine speed 344 and the mass air flowrate.

The command generation module 340 determines whether the potential compressor pressure ratio 348 is greater than the predetermined pressure ratio at 520. If 520 is false, control returns to 404. If 520 is true, the command generation module 340 generates the close command 308 at 524. The valve actuator module 150 closes the recirculation valve 148 when the close command 308 is generated. While the control is shown as ending after 424 and 524, FIGS. 5A and 5B are illustrative of one control loop, control loops may be performed at a predetermined rate.

Figure 6:
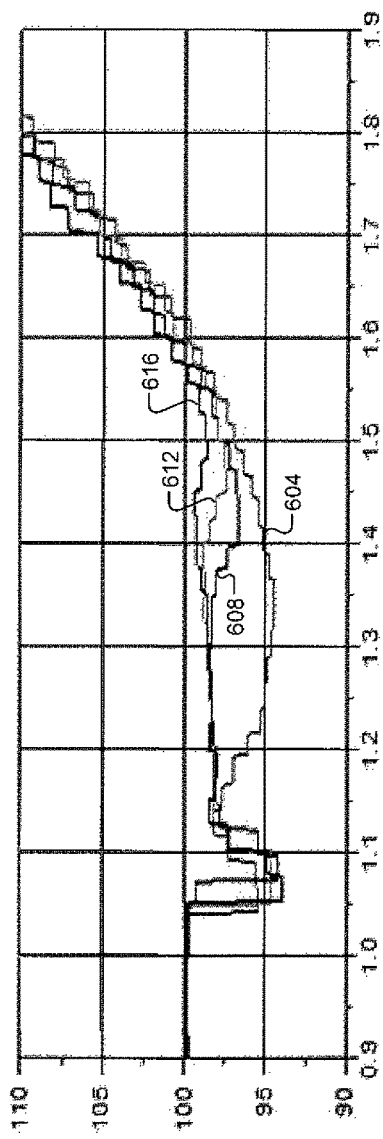
FIGS. 6 and 7 are example graphs of boost pressure versus time.
Figure 7:
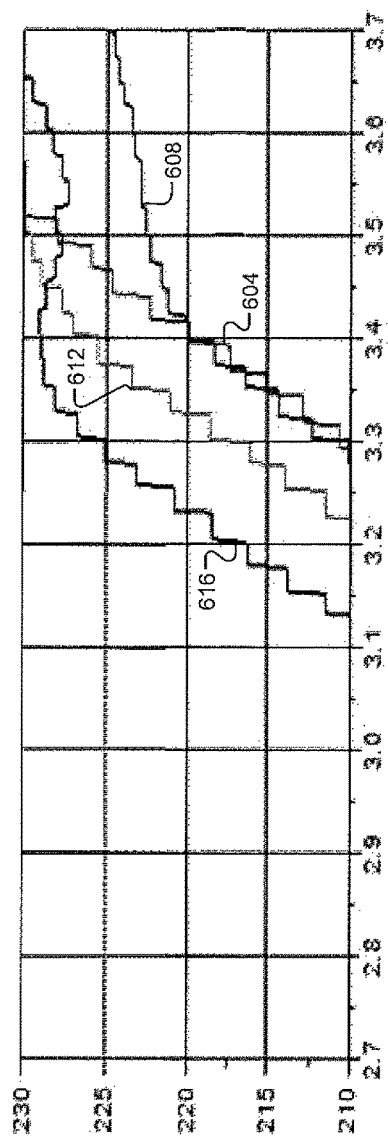

Referring now to FIGS. 6 and 7, example graphs of boost pressure versus time are presented. Trace 604 tracks boost pressure when the close command 308 is generated after the close request 320 is generated. Trace 608 tracks boost pressure when the close command 308 is generated 200 ms after the close request 320 is generated. Trace 612 tracks boost pressure when the close command 308 is generated 250 ms after the close request 320 is generated. Trace 616 tracks boost pressure when the close command 308 is generated 300 ms after the close request 320 is generated.

As illustrated in FIG. 6, the drop in boost pressure that is shown in the trace 604 can be avoided by delaying the generation of the close command 308. As illustrated in FIG. 7, by delaying the generation of the close command 308 and delaying the closing of the recirculation valve 148, the boost pressure reaches a target value sooner than it does without the delayed closing.

Figure 8:
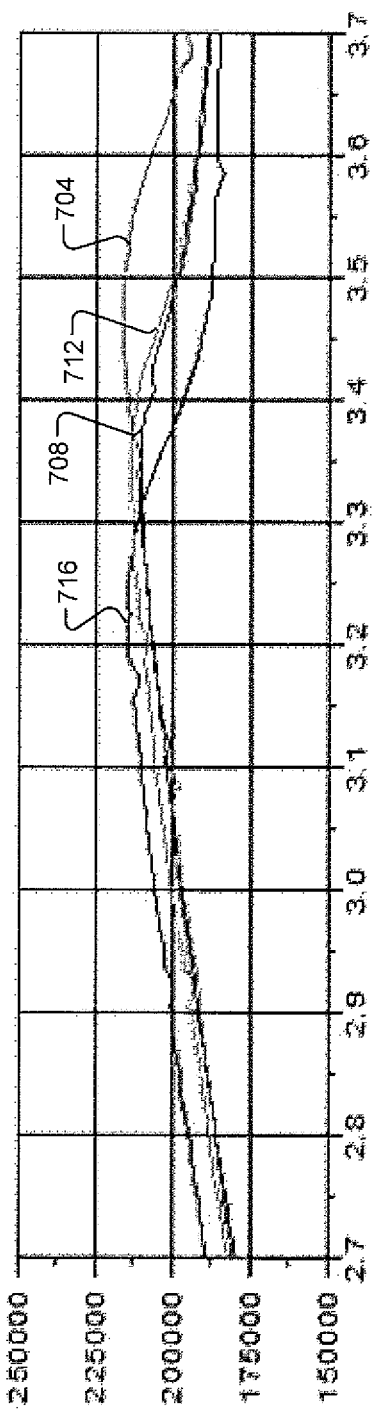
FIG. 8 is an example graph of turbocharger speed versus time.

Referring now to FIG. 8, an example graph of turbocharger speed versus time is presented. Trace 704 tracks turbocharger speed when the close command 308 is generated after the close request 320 is generated. Trace 708 tracks turbocharger speed when the close command 308 is generated 200 ms after the close request 320 is generated. Trace 712 tracks turbocharger speed when the close command 308 is generated 250 ms after the close request 320 is generated. Trace 716 tracks turbocharger speed when the close command 308 is generated 300 ms after the close request 320 is generated. As illustrated in FIG. 8, by delaying the generation of the close command 308 and delaying the closing of the recirculation valve 148, the turbocharger reaches a target speed sooner than it does without the delayed closing.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A control system comprising:
a recirculation valve of a turbocharger, the recirculation valve configured to recirculate air from an outlet of a compressor of the turbocharger to an inlet of the compressor of the turbocharger;

a first electronic circuit configured to determine a target boost for the turbocharger based on a torque request;

a second electronic circuit configured to selectively generate a close request to close the recirculation valve based on the target boost; and a third electronic circuit configured to:
   delay generation of a close command in response to the generation of the close request; and
   close the recirculation valve in response to the generation of the close command.

2. The control system of claim 1, wherein the second electronic circuit is further configured to generate the close request to close the recirculation valve when the target boost is greater than a predetermined boost.

3. The control system of claim 2, wherein the second electronic circuit is further configured to generate the close request when the target boost is greater than ambient pressure.

4. The control system of claim 1, wherein the third electronic circuit is further configured to generate the close command when a predetermined delay period has passed after the close request is generated.

5. The control system of claim 1, wherein, after the close request is generated, the third electronic circuit is further configured to determine when to generate the close command based on a comparison of a potential pressure ratio across a compressor of the turbocharger and a predetermined pressure ratio across the compressor of the turbocharger.

6. The control system of claim 5, wherein the third electronic circuit is further configured to generate the close command when the potential pressure ratio is greater than the predetermined pressure ratio.

7. The control system of claim 6, wherein the third electronic circuit is further configured to not generate the close command when the potential pressure ratio is less than the predetermined pressure ratio.

8. The control system of claim 5, wherein the third electronic circuit is further configured to determine the potential pressure ratio based on a speed of a turbine of the turbocharger and a mass air flowrate.

9. The control system of claim 8, wherein the third electronic circuit is further configured to determine the speed of the turbine based on a pressure ratio across the turbine, an exhaust mass flowrate, and an exhaust temperature.

10. The control system of claim 5, wherein the third electronic circuit is further configured to determine the potential pressure ratio based on if the recirculation valve was closed.

11. A method, comprising:
determining a target boost for a turbocharger based on a torque request;
selectively generating a close request to close a recirculation valve of the turbocharger based on the target boost,
   wherein the recirculation valve is configured to recirculate air from an outlet of a compressor of the turbocharger to an inlet of the compressor of the turbocharger;
delaying generation of a close command in response to the generation of the close request; and
closing the recirculation valve of the turbocharger in response to the generation of the close command.

12. The method of claim 11 wherein selectively generating the close request includes generating the close request to close the recirculation valve when the target boost is greater than a predetermined boost.

13. The method of claim 11 wherein selectively generating the close request includes generating the close request when the target boost is greater than ambient pressure.

14. The method of claim 11 further comprising generating the close command when a predetermined delay period has passed after the close request is generated.

15. The method of claim 11 further comprising, after the close request is generated, determining when to generate the close command based on a comparison of a potential pressure ratio across a compressor of the turbocharger and a predetermined pressure ratio across the compressor of the turbocharger.

16. The method of claim 15 further comprising generating the close command when the potential pressure ratio is greater than the predetermined pressure ratio.

17. The method of claim 16 further comprising not generating the close command when the potential pressure ratio is less than the predetermined pressure ratio.

18. The method of claim 15 further comprising determining the potential pressure ratio based on a speed of a turbine of the turbocharger and a mass air flowrate.

19. The method of claim 18 further comprising determining the speed of the turbine based on a pressure ratio across the turbine, an exhaust mass flowrate, and an exhaust temperature.

20. The method of claim 15 further comprising determining the potential pressure ratio based on if the recirculation valve was closed.

* * * * *